(12) United States Patent
Ma et al.

(10) Patent No.: US 11,752,943 B1
(45) Date of Patent: Sep. 12, 2023

(54) AUTO PANNING CAMERA MONITORING SYSTEM INCLUDING IMAGE BASED TRAILER ANGLE DETECTION

(71) Applicant: Stoneridge, Inc., Novi, MI (US)

(72) Inventors: Liang Ma, Rochester, MI (US); Utkarsh Sharma, Troy, MI (US); Saif Imran, Canton, MI (US); Mohammad Gudarzi, Wixom, MI (US); Nguyen Phan, Allen Park, MI (US); Wenpeng Wei, Novi, MI (US)

(73) Assignee: STONERIDGE, INC., Novi, MI (US)

( * ) Notice: Subject to any disclaimer, the term of this patent is extended or adjusted under 35 U.S.C. 154(b) by 0 days.

(21) Appl. No.: 17/832,815

(22) Filed: Jun. 6, 2022

(51) Int. Cl.
  *B60R 1/26* (2022.01)
  *B60R 1/28* (2022.01)
  *G06T 3/20* (2006.01)
  *G06V 20/56* (2022.01)
  *B60R 1/00* (2022.01)

(52) U.S. Cl.
  CPC ............ *B60R 1/26* (2022.01); *B60R 1/002* (2013.01); *B60R 1/28* (2022.01); *G06T 3/20* (2013.01); *G06V 20/588* (2022.01); *B60R 2300/802* (2013.01)

(58) Field of Classification Search
  CPC ..... B60R 2001/1215; B60R 1/26; B60R 1/25; B60R 1/002; B60R 1/24; B60R 1/28; B60R 1/29; B60R 2300/101; B60R 2300/30; B60R 2300/802; B60R 1/00; B60R 2300/70; B60R 2300/80; B60R 11/04; B60R 11/0235; B60R 2011/0276; B60R 2300/205; G06T 3/20; G06V 20/58; G06V 20/588; B60K 2370/176; B60K 2370/1868; B60K 2370/21; B60K 2370/52; B60K 2370/797; B60K 35/00; B60K 2370/152; B60K 2370/1526; B60K 2370/1529; B60K 2370/1531; B60K 2370/1533; B60K 2370/736; B60K 2370/739; H04N 7/181
  USPC ........................................................ 348/148
  See application file for complete search history.

(56) References Cited

U.S. PATENT DOCUMENTS

| | | | |
|---|---|---|---|
| 2016/0001705 A1* | 1/2016 | Greenwood | G01B 11/272 348/148 |
| 2017/0174128 A1* | 6/2017 | Hu | G06T 7/74 |
| 2018/0043933 A1* | 2/2018 | Hu | B62D 13/06 |
| 2018/0319437 A1* | 11/2018 | Hu | B62D 13/06 |
| 2020/0285913 A1* | 9/2020 | Gavrilovic | G06F 18/2415 |

\* cited by examiner

*Primary Examiner* — Nathnael Aynalem
(74) *Attorney, Agent, or Firm* — Carlson, Gaskey & Olds, P.C.

(57) ABSTRACT

A method for automatically panning a view for a commercial vehicle includes receiving a video feed from at least one camera defining a field of view. A plurality of objects in the video feed, includes at least one wheel and at least one line, are identified. A path of each object in the plurality of objects is tracked through an image plane of the video feed. A trailer angle corresponding to each path is identified, the identified trailer angle is associated with the corresponding path, thereby generating a plurality of trailer angle measurements. The plurality of paths are down selected to a single path and identifying a single trailer angle measurement corresponding to the single path.

18 Claims, 6 Drawing Sheets

AUTO PANNING CAMERA MONITORING SYSTEM INCLUDING IMAGE BASED TRAILER ANGLE DETECTION

TECHNICAL FIELD

This disclosure relates to a camera monitoring system (CMS) for use in a commercial truck or similar vehicle, and in particular to a CMS having an auto-panning feature including image based trailer angle estimates.

BACKGROUND

Mirror replacement systems, and camera systems for supplementing mirror views, are utilized in commercial vehicles to enhance the ability of a vehicle operator to see a surrounding environment. Camera monitoring systems (CMS) utilize one or more cameras to provide an enhanced field of view to a vehicle operator. In some examples, the mirror replacement systems cover a larger field of view than a conventional mirror, or include views that are not fully obtainable via a conventional mirror.

In certain operations, such as trailer reversing maneuvers, stationary views such as those provided by a fixed mirror or a fixed field of view camera may not provide a full view of the operation and desirable information that could be presented to the operator is not presented to the operator. Manual panning systems, where the operator manually adjusts a physical camera or mirror angle can require frequent stopping of the maneuver to adjust the view provided and can provide insufficient granularity to the adjustments.

Some example systems attempt to minimize the issues with manual panning by implementing automatic or semi-automatic panning. Such systems rely on estimates of trailer angle that are potentially inaccurate and the kinematic models of vehicle operations, particularly in reversing operations, can have a difficult time accounting for the potential variability of the trailer angle estimates.

SUMMARY OF THE INVENTION

In one exemplary embodiment a method for automatically panning a view for a commercial vehicle includes receiving a video feed from at least one camera, wherein the camera defines a field of view, identifying a plurality of objects in the video feed, wherein the plurality of objects includes at least one wheel and at least one line, tracking a path of each object in the plurality of objects through an image plane of the video feed, identifying a trailer angle corresponding to each path and associating the identified trailer angle with the corresponding path, thereby generating a plurality of trailer angle measurements, and down selecting the plurality of paths to a single path and identifying a single trailer angle measurement corresponding to the single path.

Another example of the above described method for automatically panning a view for a commercial vehicle further includes providing the single trailer angle measurement to an image panning system and panning the view based at least in part on the single trailer angle and a current vehicle operation.

In another example of any of the above described methods for automatically panning a view for a commercial vehicle panning the view includes maintaining a trailer end in the view.

In another example of any of the above described methods for automatically panning a view for a commercial vehicle panning the view includes maintaining the trailer end in an approximate center of the view.

In another example of any of the above described methods for automatically panning a view for a commercial vehicle down selecting the plurality of trailer angles includes for each track, determining a numerical quantifier for each parameter in a plurality of parameters of the track, for each track, summing the determined numerical quantifiers and determining a weighted score corresponding to the track, comparing the weighted score of each track and identifying the track having the highest weighted score, and selecting the trailer angle corresponding to the track having the highest weighted score as the single trailer angle.

In another example of any of the above described methods for automatically panning a view for a commercial vehicle identifying the plurality of objects includes identifying a plurality of lines and edges in the image using one of a Hough transform and a deep neural network.

In another example of any of the above described methods for automatically panning a view for a commercial vehicle identifying the plurality of lines and edges includes identifying an angle, start point, end point, of each line and edge in the plurality of lines and edges.

In another example of any of the above described methods for automatically panning a view for a commercial vehicle identifying the plurality of objects includes identifying a position of each wheel in the image using one of a blob transform image analysis and a deep neural network.

Another example of any of the above described methods for automatically panning a view for a commercial vehicle further includes identifying a wheel angle of each wheel using image analysis.

In one exemplary embodiment a camera system for a vehicle includes at least a first camera defining a field of view, a controller communicatively connected to the first camera, the controller including a processor and a memory, the memory storing instructions for automatically panning a view for a vehicle by receiving a video feed from the first camera at the controller, wherein the camera defines a field of view. identifying a plurality of objects in the video feed using the controller, wherein the plurality of objects includes at least one wheel and at least one line, tracking a path of each object in the plurality of objects through an image plane of the video feed using the controller, identifying a trailer angle corresponding to each path, thereby generating a plurality of trailer angle measurements using the controller, and down selecting the plurality of paths to a single path, and identifying a trailer angle measurement corresponding to the single path using the controller.

In another example of the above described camera system for a vehicle identifying the trailer angle corresponding to each path includes converting one of a line detection and a wheel detection of each object into a two dimensional trailer angle and converting the two dimensional trailer angle into a real world angle of the trailer angle relative to a cab.

In another example of any of the above described camera systems for a vehicle the controller is configured to apply Kalman filtering to each real world trailer angle, and wherein the Kalman filtering associates the real world trailer angle with the corresponding track and updates at least one property of the corresponding track.

In another example of any of the above described camera systems for a vehicle the properties of each track include at least variance, age, direction, and source.

In another example of any of the above described camera systems for a vehicle down selecting the identified trailer angles includes, for each track, determining a numerical quantifier for each parameter in a plurality of parameters of the track, for each track, summing the determined numerical quantifiers and determining a weighted score corresponding to the track, comparing the weighted scores corresponding to each track and identifying the track having the highest weighted score, and selecting the trailer angle corresponding to the tack having the highest weighted score as the single trailer angle.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
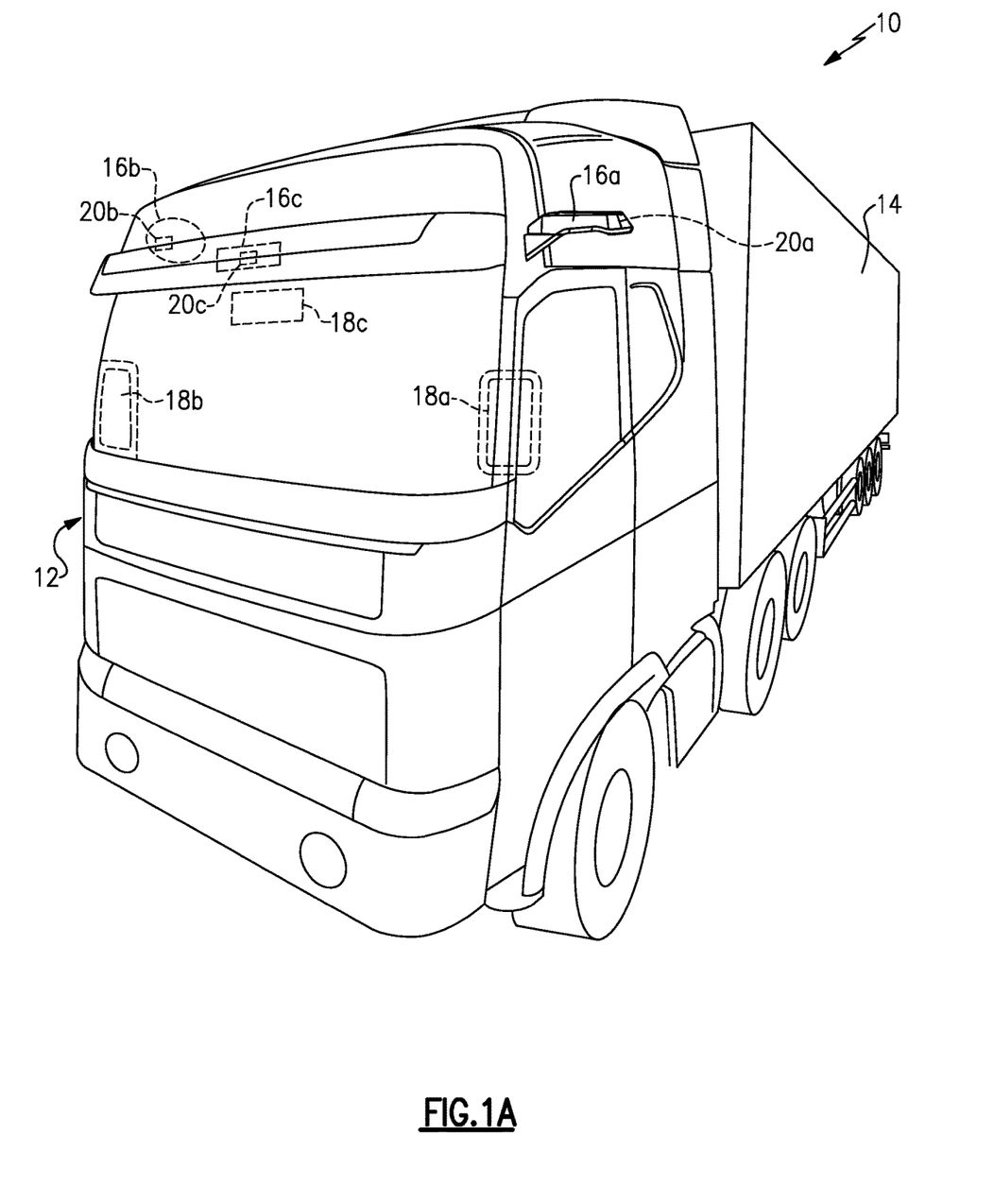
FIG. 1A is a schematic front view of a commercial truck with a camera monitoring system (CMS) used to provide at least Class II and Class IV views.
Figure 1B:
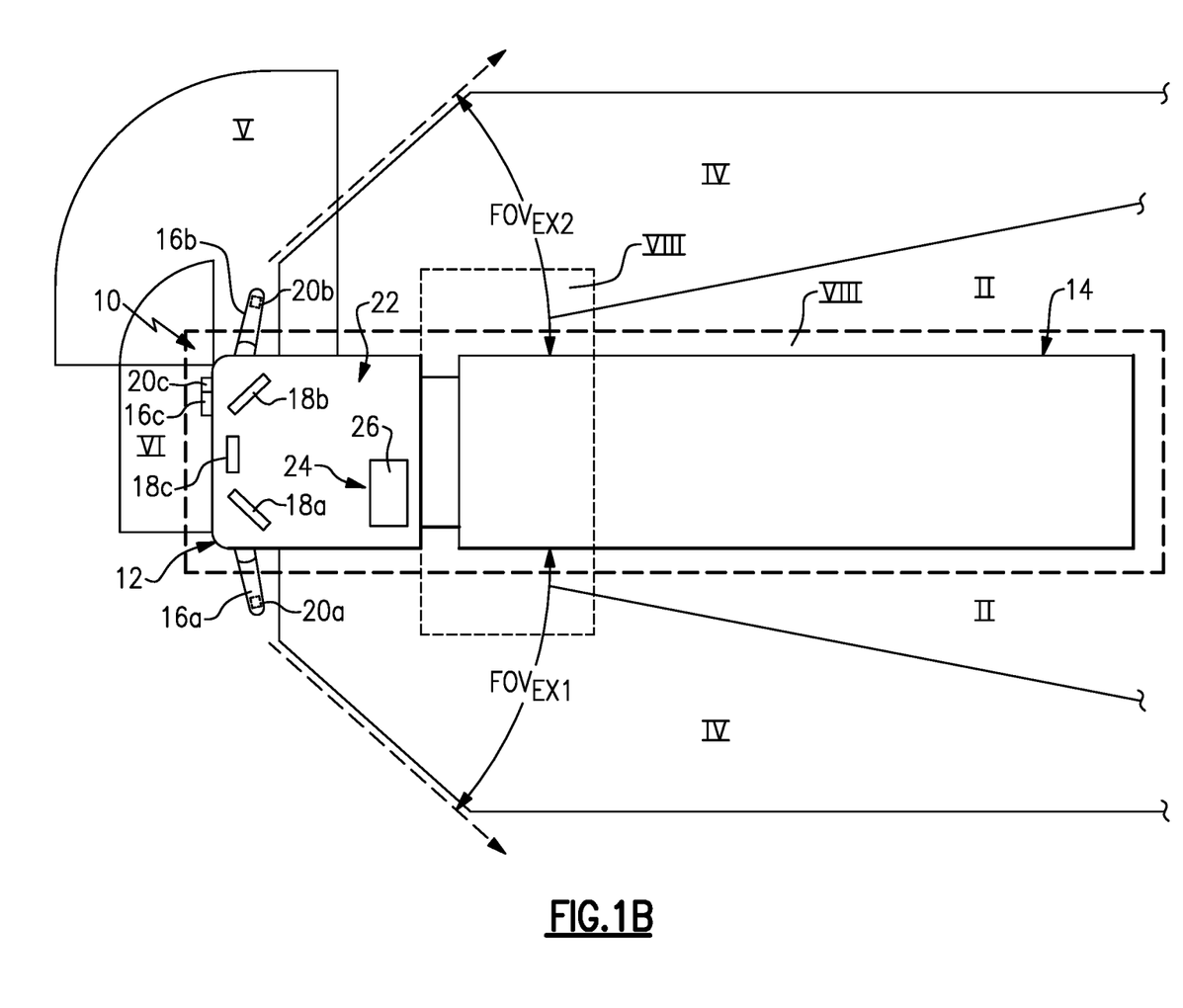
FIG. 1B is a schematic top elevational view of a commercial truck with a camera monitoring system providing Class II, Class IV, Class V and Class VI views.
Figure 2:
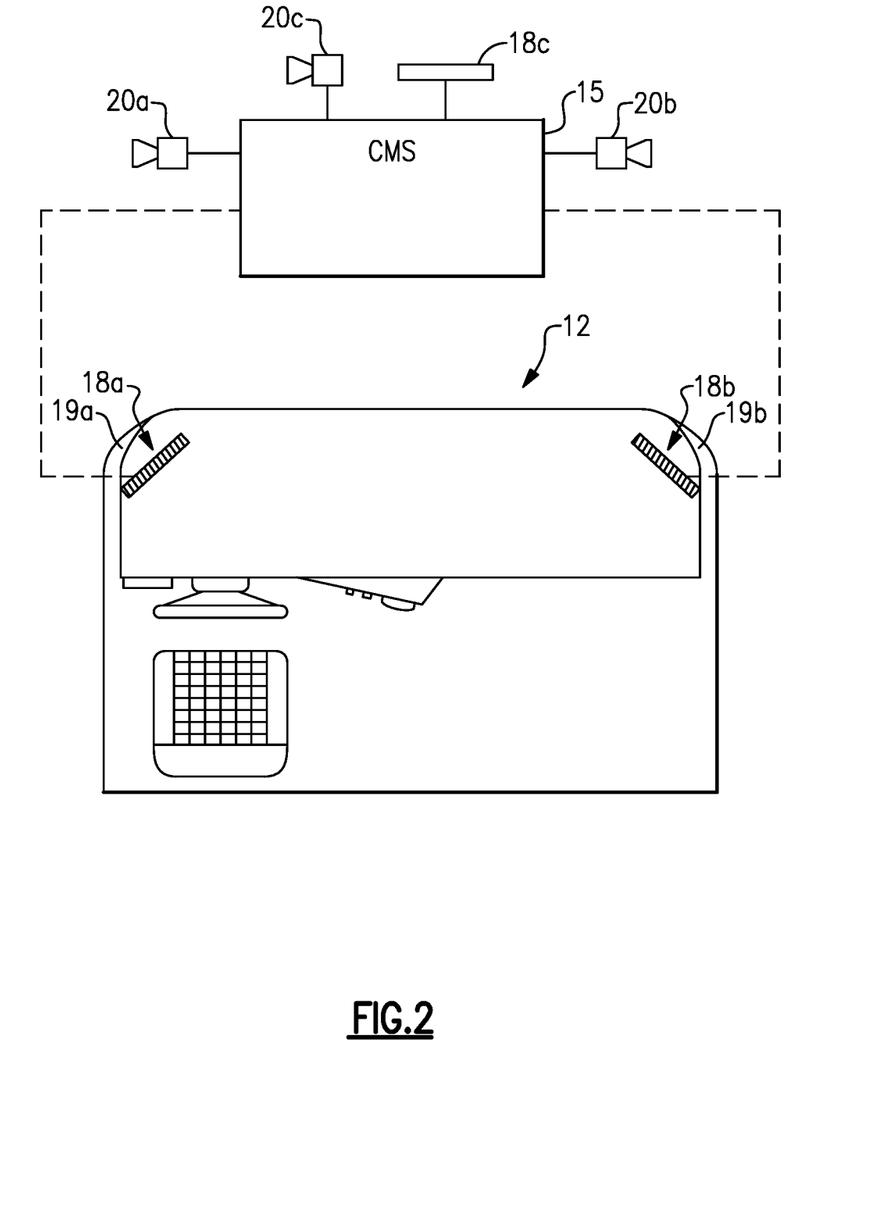
FIG. 2 is a schematic top perspective view of a vehicle cabin including displays and interior cameras.

An exterior schematic view of a commercial vehicle 10 is illustrated in FIGS. 1A and 1B. An interior schematic view of the cab of the commercial vehicle 10 is illustrated in FIG. 2. The vehicle 10 includes a vehicle cab or tractor 12 for pulling a trailer 14. Although a commercial truck is contemplated in this disclosure, the invention may also be applied to other types of vehicles. The vehicle 10 incorporates a camera monitoring system (CMS) 15 that has driver and passenger side camera arms 16a, 16b mounted to the outside of the vehicle cab 12. If desired, the camera arms 16a, 16b may include conventional mirrors integrated with them as well, although the CMS 15 can be used in some examples to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. The class II view on a given side of the vehicle 10 is a subset of the class IV view of the same side of the vehicle 10. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view.

Figure 3A:
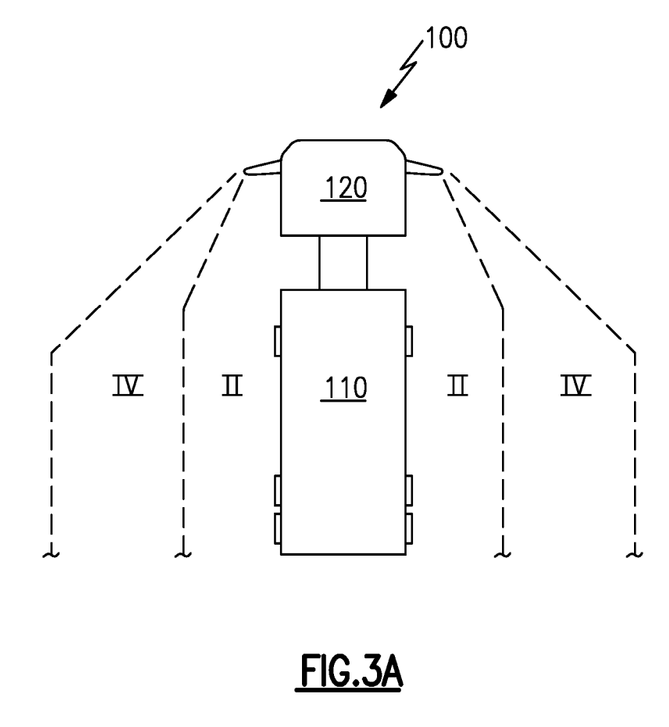
FIG. 3A illustrates a vehicle at the initiation of a reverse maneuver, with no trailer angle.
Figure 3B:
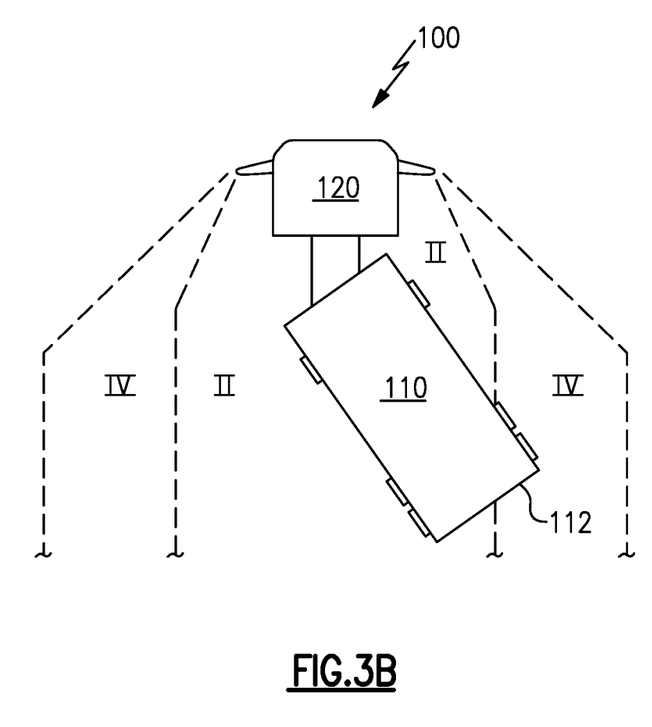
FIG. 3B illustrates the vehicle mid reversing maneuver, with a high trailer angle.

With continued reference to FIGS. 1A, 1B and 2, FIGS. 3A and 3B illustrate a vehicle 100 in the process of executing a reversing maneuver. In the initial position (FIG. 3A) the trailer 110 has an initial angle of approximately zero degrees relative to the cab 120, meaning that the trailer is aligned with the orientation of the cab 120. This angle can alternatively be expressed as 180 degrees relative to the cab 120. During the process of reversing, and particularly when reversing through a turn, the trailer 110 skews relative the cab 120 (FIG. 3B) creating a trailer angle that impacts reversing maneuvers. In addition, the reversing speed, the yaw of the trailer as well as other operating parameters have an impact on the trailer angle change during the reversing. The particular skew of FIG. 3B is exaggerated relative to most expected angles for the illustrative purposes.

In order to assist the driver in making the reversing maneuver, it is beneficial to ensure that the rear 112 of the trailer 110 is visible to the driver in at least one display through the reversing maneuver. In some particular examples, it is desirable to not only include the rear 112 of the trailer 110, but also to center the class II view on the rear 112 of the trailer 110. However, as illustrated in FIG. 3B, a static class II view can result in the rear 112 of the trailer 110 extending beyond the boundaries of the class II view even when the rear 112 remains within the Class IV field of view. In order to prevent loss of view of the rear 112 of the trailer 110 in the class II view, or to maintain centering of the class II view on the rear 112 of the trailer 110, the vehicle 10, 100 illustrated herein includes an auto-panning feature within the camera monitoring system.

The auto-panning feature uses a combination of distinct image based trailer angle detections to determine the trailer angle relative to the tractor at any given time. The system identifies multiple determined trailer angles and determines which of the new trailer angles is the most accurate using a down selection process. The determined most accurate angle detection is provided to a vehicle controller and the vehicle controller utilizes the angle with any system configured to uses the trailer angle, including auto panning systems. In the example of an auto panning system, the vehicle controller can automatically pan a displayed view (e.g., a class II view)

within the corresponding camera's entire field of view in order to ensure that a trailer end is maintained within the view during a reversing operation. In some examples, the panning response is dependent on the current operating mode of the vehicle, and the view may be panned differently depending on whether the vehicle is moving forward, is in reverse, and/or depending on the rate at which the vehicle is traveling, depending on the position of the steering wheel, or any other factors. In some examples, it may be further advantageous to ensure that not only is the trailer maintained in the view, but the trailer is maintained at or near the center of the view. In these cases, the auto-panning system centers the view on the trailer end.

By way of example, during operation the trailer angle detection system receives a sequence of images from the mirror replacement system (or a similar camera monitoring system) and processes the images for line detection and wheel detection. The positions within the image of the lines, as determined by the line detection system, and the positions within the images of the wheels, as determined by the wheel detection system, are tracked over time. The path of each detected wheel and line through the image is referred to as a "track" and is used by an angle detection controller module to evaluate a reliability of a corresponding identified trailer angle.

The angle detection controller module uses a known correlation between the position within the image and the trailer angle to determine a trailer angle based on each identified object, and the detected trailer angle is correlated to the current position and stored as a property of the track. In some instances, the track shape can additionally be used to predict near future trailer angles as well. By way of example if the track shape smoothly follows an increasing trailer angle path, the near future prediction may be that the trailer angle will continue increasing at the identified rate.

Each track has multiple properties including trailer angle, variance, age, direction, source and similar properties. Further, tracks corresponding to line and edge detection include line angle, intercepts with other objects, a line start point and a line end point and tracks corresponding to wheel detection include an angle of the wheel relative to the trailer (alternately referred to as a wheel angle). Each property is quantified using a numerical value (e.g., the variance may receive a value from 0, meaning highly variant, to 100, meaning almost no variance). Each quantified numerical value is weighted based on its relative value in determining the accuracy of the angle prediction.

Once detected by the angle detection controller module, the multiple detected angles are provided to a down selector module. The down selector module compiles the weighted score of each track and identifies the most accurate detected trailer angle from the detected trailer angles by determining which track has the highest weighted score. The determined trailer angle is passed to one or more vehicle systems that is configured to utilize the selected trailer angle. In some instances, the tracks corresponding to wheel detections can be further provided to a wheelbase detection module. The wheelbase detection module uses the wheelbase tracks to determine an estimated wheelbase position and/or wheelbase length depending on what values the controller requires for a given operation. Furthermore, the track(s) can be provided to any other controller and/or system able to utilize the tracks through the image.

With continued reference to FIGS. 1-3B, FIG. 4 illustrates a process 400 for determining a trailer angle. While the process 400 is described in FIG. 4 with regards to operations within a single controller, it is appreciated that some or all the steps may be performed in separate controllers and/or using separate processors or threads within a controller in communication with each other and function in the same manner.

Figure 4:
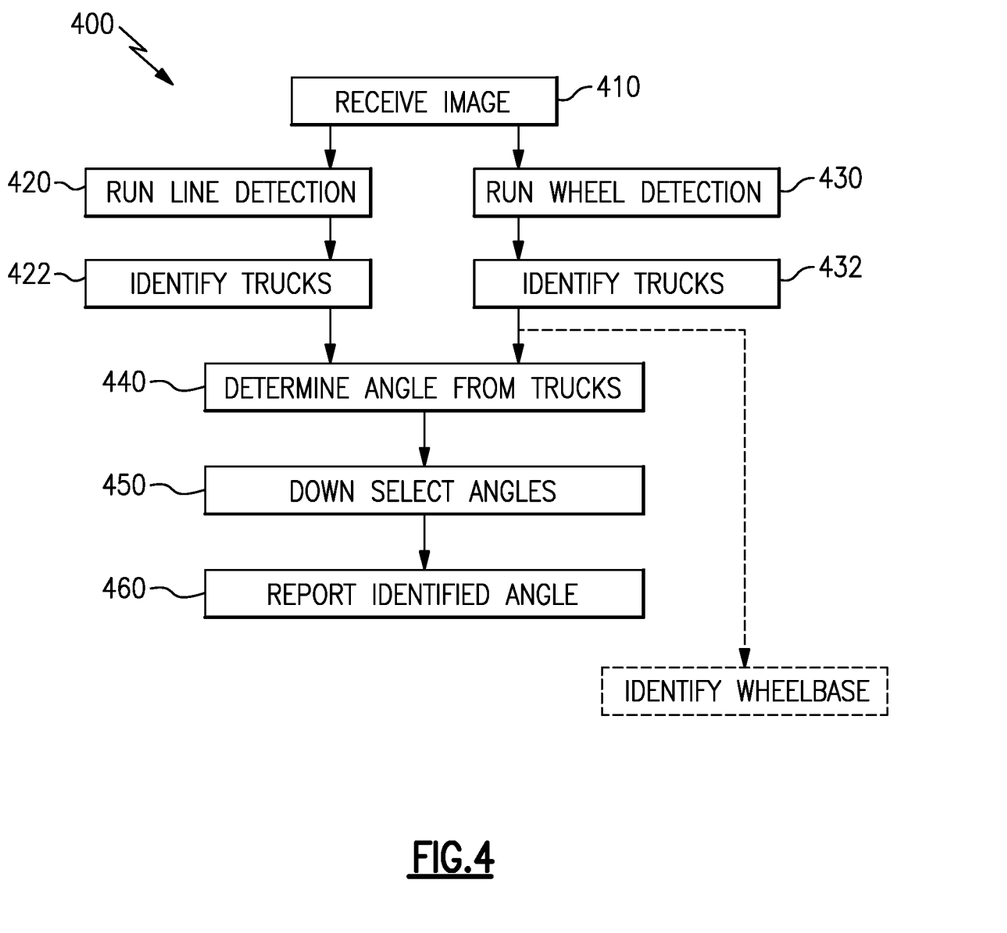
FIG. 4 illustrates a process for determining a trailer angle using image analysis.

Initially, the controller receives an image from a video feed in a "Receive Image" step 410. The image is a single frame of a video feed from a camera monitoring system, and the process 400 is repeated for multiple images within a sequence of a video feed. The controller runs a line detection process on the received image in a "Run Line Detection" step 420 and a wheel detection process on the received image in a "Run Wheel Detection" step 430. Both the line detection and the wheel detection processes use image analysis to identify the corresponding elements. The detections can be rule based, neural network based, or a combination of the two. The distinct steps 420, 430 operate simultaneously to provide the detections.

In one example, the line detection process identifies lines and edges within the image using a Hough transform process. In alternative examples, alternative line detection processes, such as deep learning neural networks and similar systems can be used to the same effect. In addition to the position of the line, the line detection process identifies at least the line angle, intercepts with other objects, a line start point and a line end point. The position of the identified lines and edges, as well as the corresponding data points for each line are saved and the path through the image of each identified line and edge is stored in a memory in an "Identify Tracks" step 422. The path through the image frame over time in the video feed is referred to as the object's track and each of the edge and line tracks is continuously updated as the process 400 is reiterated.

Simultaneously with the line detection, wheels are detected within the image using a blob detection process in a "Run Wheel Detection" step 430. In alternative examples, the wheels can be detected using alternative image analysis systems such as deep learning neural networks. In addition to the position of the wheel within the image, the wheel detection identifies an angle of the wheel relative to the trailer (alternately referred to as a wheel angle) at each iteration of the process 400. As with the lines and edges, the path of each identified wheel is tracked through the image feed over time in an "Identify Tracks" step 432. Each identified wheel is tracked separately and a distinct track is stored for each of the wheels.

In some examples, the number of wheels, lines, and edges that are tracked can be limited to 16 in order to save controller resources. In other examples, alternative numbers objects can be tracked.

The tracks from each of the identify tracks steps 422, 432 are used by the controller to determine a corresponding angle of the trailer in a "Determine Angle From Tracks" step 440. Initially in the determine angle from tracks step 440, the two dimensional angle of the trailer is determined for each track based on the current position within the image of the element being tracked. E.G., for a driver side rear wheel track, the two dimensional angle of the driver side rear wheel is identified. After determining the two dimensional angle for each element, the two dimensional angles are converted to a three dimensional coordinate using a conventional converter. The three dimensional coordinate is used to determine a corresponding three dimensional trailer angle measurement. The real world trailer angle relative to the cab is referred to herein as a "3D trailer angle" or a "3D angle" or "three dimensional trailer angle".

For each trailer angle measurement based on the three dimensional angle measurement, Kalman filtering is applied to associate the three dimensional angle with the corresponding track and measurement information is used to update the angle's track properties (e.g., three dimensional angle, angle rate, etc.).

After having determined the 3D angle for each component, a down selection process is applied to identify which 3D angle is the most accurate. As described above, each angle track includes multiple properties, each of which has a weighted numerical quantifier. The weighted numerical qualifiers for each property of a given track is summed to generate a total score for the given track. The total scores are compared, and the track with the highest score is selected as the most accurate trailer angle estimate. In alternative examples, the weighted numerical qualifiers can be minimal in function, with a lower score indicating a higher accuracy. In such examples, the track with the lowest sum would be selected as the most accurate. Each other 3D angle is discounted, and the most accurate 3D angle is adopted as the accurate angle in a "Down Select Angles" step 450.

Once determined, the down selected angle is reported out to one or more systems within the controller to be utilized in a "Report Identified Angle" step 460. In one example, the identified angle is reported to an automatic panning system that pans a class II view presented to the user based on the determined trailer angle and one or more current operating parameters.

In some examples, the identified tracks corresponding to the wheel detections are also provided to a wheelbase determination module and the wheel detections are used to estimate or identify a position and/or length of the wheel base of the trailer attached to the vehicle in an "Identify Wheel Base" step 470.

Figure 5:
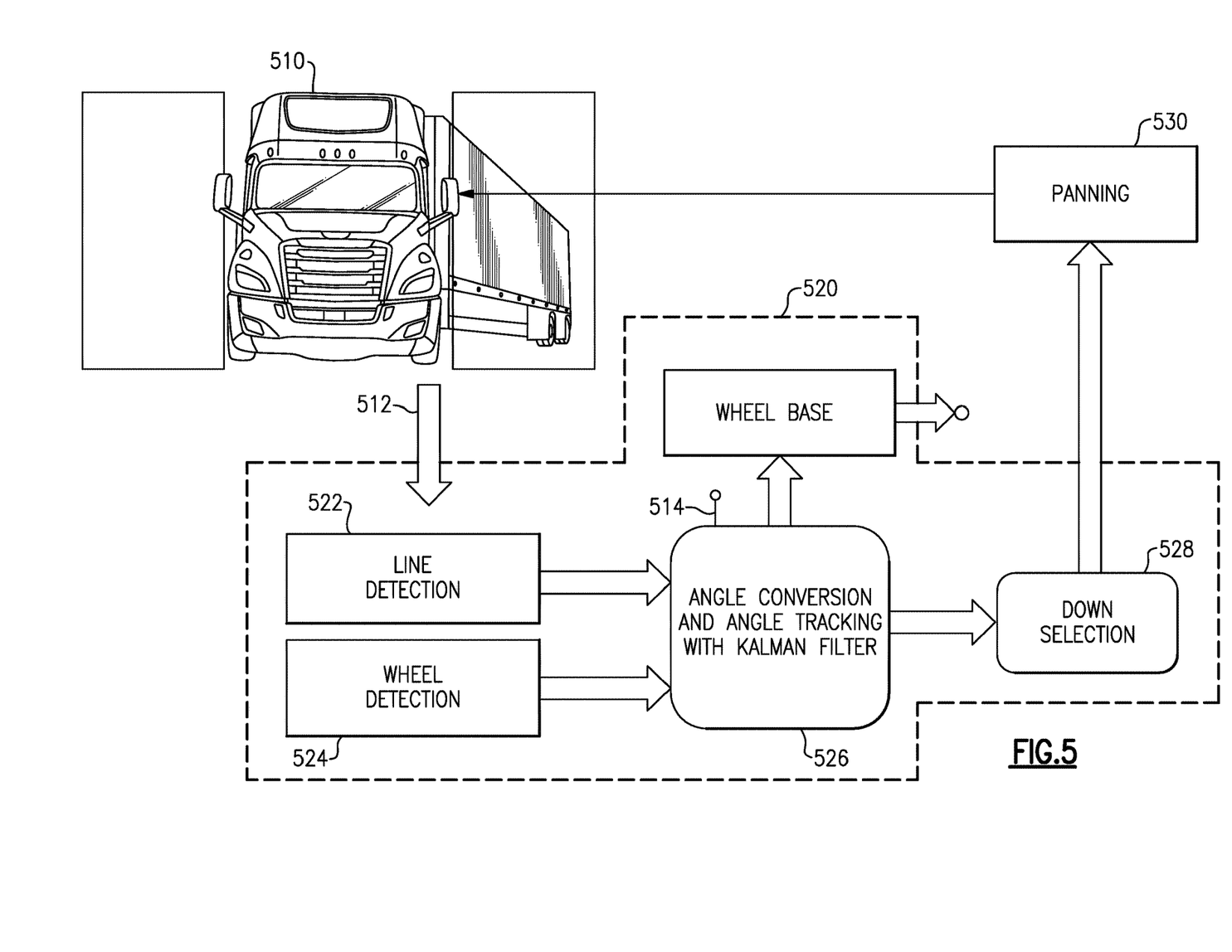
FIG. 5 illustrates a system for determining a trailer angle from images using the method of FIG. 4, and automatically panning a camera monitoring system based on the determined angle.

With continued reference to FIG. 4, FIG. 5 schematically illustrates an example auto-panning system for a vehicle 510. A controller 520 receives images 512 and other sensor information 514 from the vehicle 510, and the controller 520 identifies lines within the received images 512 using a line detection module 522 and identifies wheel positions and angles within the received images 512 using a wheel detection module 524. The tracks identified by the wheel detection 524 module and the line detection module 522 are provided to the angle conversion module 526. In addition to the detections from the line detection module 522 and the wheel detection module 524, the angle conversion module 526 receives sensor information 514 including yaw rate, host speed and other sensor information that is indicative of a current operation of the vehicle.

The angle conversion module 526 correlates each track received from the line detection module 522 and the wheel detection module 524 with a corresponding 2D trailer angle using a Kalman filtering process. As described above, alternative processes can be used to the same effect to convert each track into a corresponding angle detection. The Angle conversion module 526 then converts each identified 2D trailer angle to a corresponding 3D trailer angle and the 3D trailer angles are provided to a down selection module 528. The down selection module 528 selects the single best trailer angle estimate based on the weighted scoring described above.

The single selected trailer angle is provided to a panning system 530. While illustrated in the example embodiments as a distinct controller, it is appreciated that the panning system 530 can be included within the controller 520 as a software module in alternative examples. In one example, the automatic panning is configured to ensure that the rear edge of the trailer is maintained within the class II view throughout operations of the vehicle. In other implementations, the automatic panning can maintain other objects or portions of objects in the view depending on the needs of the current operation of the vehicle.

The identification of multiple trailer angles which are down selected to a single accurate trailer angle can be used across multiple systems, and are not limited in application to an auto-panning system.

Although an example embodiment has been disclosed, a worker of ordinary skill in this art would recognize that certain modifications would come within the scope of the claims. For that reason, the following claims should be studied to determine their true scope and content.

What is claimed is:

1. A method for automatically panning a displayed view for a commercial vehicle comprising:
   receiving a video feed from at least one camera, wherein the camera defines a field of view;
   identifying a plurality of objects in the video feed, wherein the plurality of objects includes at least one wheel and at least one line;
   tracking a path of each object in the plurality of objects through an image plane of the video feed;
   identifying a trailer angle corresponding to each path and associating the identified trailer angle with the corresponding path, thereby generating a plurality of trailer angle measurements; and
   down selecting the plurality of paths to a single path and identifying a single trailer angle measurement corresponding to the single path.

2. The method of claim 1, further comprising providing the single trailer angle measurement to an image panning system and panning the displayed view based at least in part on the single trailer angle and a current vehicle operation.

3. The method of claim 2, wherein panning the displayed view comprises maintaining a trailer end in the view.

4. The method of claim 3, wherein panning the displayed view comprises maintaining the trailer end in an approximate center of the view.

5. The method of claim 1, wherein down selecting the plurality of trailer angles comprises:
   for each track, determining a numerical quantifier for each parameter in a plurality of parameters of the track;
   for each track, summing the determined numerical quantifiers and determining a weighted score corresponding to the track;
   comparing the weighted score of each track and identifying the track having the highest weighted score; and
   selecting the trailer angle corresponding to the track having the highest weighted score as the single trailer angle.

6. The method of claim 1, wherein identifying the plurality of objects comprises identifying a plurality of lines and edges in the image using one of a Hough transform and a deep neural network.

7. The method of claim 6, wherein identifying the plurality of lines and edges comprises identifying an angle, start point, end point, of each line and edge in the plurality of lines and edges.

8. The method of claim 1, wherein identifying the plurality of objects includes identifying a position of each wheel in the image using one of a blob transform image analysis and a deep neural network.

9. The method of claim 8, further comprising identifying a wheel angle of each wheel using image analysis.

10. A camera system for a vehicle comprising:
    at least a first camera defining a field of view;

a controller communicatively connected to the first camera, the controller including a processor and a memory, the memory storing instructions for automatically panning a displayed view for a vehicle by:
receiving a video feed from the first camera at the controller, wherein the camera defines a field of view;
identifying a plurality of objects in the video feed using the controller, wherein the plurality of objects includes at least one wheel and at least one line; tracking a path of each object in the plurality of objects through an image plane of the video feed using the controller;
identifying a trailer angle corresponding to each path, thereby generating a plurality of trailer angle measurements using the controller; and
down selecting the plurality of paths to a single path, and identifying a trailer angle measurement corresponding to the single path using the controller.

11. The camera system of claim 10, wherein identifying the trailer angle corresponding to each path comprises converting one of a line detection and a wheel detection of each object into a two dimensional trailer angle and converting the two dimensional trailer angle into a real world angle of the trailer angle relative to a cab.

12. The camera system of claim 11, wherein the controller is configured to apply Kalman filtering to each real world trailer angle, and wherein the Kalman filtering associates the real world trailer angle with the corresponding track and updates at least one property of the corresponding track.

13. The camera system of claim 12, wherein the properties of each track include at least variance, age, direction, and source.

14. The camera system of claim 10, wherein down selecting the identified trailer angles comprises:
for each track, determining a numerical quantifier for each parameter in a plurality of parameters of the track;
for each track, summing the determined numerical quantifiers and determining a weighted score corresponding to the track;
comparing the weighted scores corresponding to each track and identifying the track having the highest weighted score; and
selecting the trailer angle corresponding to the tack having the highest weighted score as the single trailer angle.

15. The method of claim 10, wherein identifying the plurality of objects comprising identifying a plurality of lines and edges in the image using a Hough transform.

16. The method of claim 15, wherein identifying the plurality of lines and edges comprises identifying an angle, start point, end point, of each line and edge in the plurality of lines and edges.

17. The method of claim 10, wherein identifying the plurality of objects includes identifying a position of each wheel in the image using a blob transform image analysis.

18. The method of claim 17, further comprising identifying a wheel angle of each wheel using image analysis.

* * * * *